United States Patent [19]
Jurovsky

[11] 3,943,781
[45] Mar. 16, 1976

[54] DEVICE FOR TRANSMITTING THE DISPLACEMENT OF A PRESSURE-RESPONSIVE ELEMENT SITUATED IN PRESSURE SPACE

[76] Inventor: Albert Yakovlevich Jurovsky, ulitsa Baltiiskaya, 4, kv. 94, Moscow, U.S.S.R.

[22] Filed: June 11, 1974

[21] Appl. No.: 478,337

[30] Foreign Application Priority Data
June 18, 1973 U.S.S.R. ............................ 1933175

[52] U.S. Cl. ............................................. 74/18.1
[51] Int. Cl.² ....................................... F16J 15/50
[58] Field of Search ...................... 74/18.1; 73/407

[56] References Cited
UNITED STATES PATENTS

| | | | |
|---|---|---|---|
| 2,217,537 | 10/1940 | Carlstedt | 74/18.1 |
| 2,299,179 | 10/1942 | Rosenberger | 74/18.1 |
| 3,410,144 | 11/1968 | Noz et al. | 74/18.1 |

*Primary Examiner*—Samuel Scott
*Assistant Examiner*—Wesley S. Ratliff, Jr.
*Attorney, Agent, or Firm*—Holman & Stern

[57] ABSTRACT

A device for transmitting the displacement of a pressure-responsive element is situated in pressure space. The device is provided with a base hermetically held to a shell which confines the pressure space, and has a hole covered by the diaphragm hermetically held along the external perimeter of the hole. The device incorporates also a force-bar passing at the center of the diaphragm, with the end of the force-bar protruding inside the shell being adapted to interact with the pressure-responsive element, while its end extending outwards from the shell serves essentially as the output of the device; the output of the force-bar carries a cross-bar interconnected therewith through a resilient member to which, secured with their one ends, are two struts whose other ends are secured to the base, with the axes of the struts being approximately in the same plane with the axis of the diaphragm; provision is also made for a means adapted to vary the position of the axes of the struts, with such means being constructed as adjustable stops provided in the cross-bar and adapted to interact with the force-bar.

7 Claims, 5 Drawing Figures

DEVICE FOR TRANSMITTING THE DISPLACEMENT OF A PRESSURE-RESPONSIVE ELEMENT SITUATED IN PRESSURE SPACE

BACKGROUND OF THE INVENTION

This invention relates to the art of instrument making and has particular reference to devices for transmitting the displacement of a pressure-responsive element situated in a pressure space which are made use of in, say, differential pressure gauges operating on the force-balance principle.

PRIOR ART

One prior-art device for transmitting the displacement of a pressure-responsive element situated in pressure space confined within a shell comprises the base plate provided with a hole and secured in the shell; the diaphragm hermetically held to the base along the external perimeter of the hole in the base plate so as to close said hole; the force-bar passing through the hole in the base plate and through the diaphragm at its center, with said force-bar being connected with one of its ends to the pressure-responsive element, while the other end thereof serves as the output of the device; the cross-bar mounted on the force-bar outside the pressure space; two struts arranged one on each side of the diaphragm lengthwise its axis, with said struts being secured with their ends to the base plate and to the cross-bar so that the longitudinal axes of the struts are approximately in the same plane with the axis of the diaphragm and a means for varying the position of the axes of the struts (cf. U.S. Pat. No. 3,440,885).

As a rule, actual constructions show some misalignment of the plane of the strut axes with the center of the diaphragm which is the point of application of the resultant force developed static pressure exerted upon the diaphragm, so that a variation in the static pressure beings about an error in transmitting the displacement of the pressure-responsive element from the static pressure space into atmosphere, with this being due to a parasitic moment on the force-bar deflecting the latter from its initial position.

There exists a problem now to carry into effect ways for aligning such devices with the view of reducing their errors due to static pressure variations that exert upon the diaphragm.

A number of solutions of said problem are hitherto known, and in particular, a device for displacement of the ends of struts which are secured to the base, however, such a device is bulky, complicated to manufacture and fails to provide stable alignment which in time adversely affects the accuracy of measurements.

OBJECTS AND SUMMARY OF THE INVENTION

It is an object of the present invention to provide a device for transmitting the displacement of a pressure-responsive element situated pressure space which ensures high-accuracy alignment of the position of strut axes.

It is another object of the present invention to provide a device of the character set forth hereinbefore which ensures a stable alignment of the position of the strut axis lasting for a lengthy period of time.

It is another object of the present invention to provide a device of the character set forth hereinbefore which is simple from the structural viewpoint.

Such objects are accomplished in a device for transmitting the displacement of a pressure-responsive element situated in a pressure space, comprising a base hermetically held to a shell which confines the pressure space, and provided with a hole covered with a diaphragm hermetically held along the external perimeter of the hole, and a force-bar passing at the center of said diaphragm, one end of said force-bar protruding inside the shell being adapted to interact with the pressure-responsive element, while the other end of the force-bar extending outwards of the shell serves essentially as the output of the device and carries a cross-bar to which are secured with one of their ends, two struts, the other ends of which are secured to the base, with the axes of said struts being approximately in the same plane with the axis of the diaphragm, and also means for varying the position of the strut axes, according to the invention, the cross-bar is connected to the force-bar through a resilient member while the means for varying the position of the strut axes comprise adjustable stops in the cross-bar, adapted to interact with the force-bar.

It is desirable that the resilient member constructed as a thin-walled cylinder enclosing the force-bar with one end connected to the force-bar, while its other end is locked-in with the cross-bar.

It is also favorable that diametrally opposite holes be provided in the thin-walled cylinder, with the axis of said holes lying in the same plane as the struts.

It is expedient that the stops be constructed as screws arranged in the cross-bar square to the axis of the force-bar on both sides thereof.

The cross-bar may be implemented as a flange with a central hole whose diameter is somewhat larger than the diameter of the force-bar.

The thin-walled cylinder can advantageously be constructed integral with the flange.

The struts may be round-sectioned rods.

The device for transmitting the displacement of a pressure-responsive element situated in a pressure space, carried into effect according to the present invention, features the following advantages over the known prototypes:

The present device is distinguished by a high-accuracy alignment of the strut axes so that only minor error occurs in response to the static pressure variations of the medium within a reasonably broad range (say, from 0 to 400 kgf/cm$^2$) effective in the zone of the pressure-responsive element.

Another advantage inherent in the present device resides in a stable alignment of the axes of the struts thereof and, consequently, remaining high measuring accuracy within a prolonged period of time.

The device made according to the present invention is structurally simple and involves no special equipment for being manufactured or adjusted, nor does it require highly skilled specialists for calibration.

Due to space-saving arrangement of the struts and means for varying the position thereof, as well as due to small dimensions of the cylindrical base, the device is convenient for use in small-sized instruments.

Other objects and advantages will become apparent from the following description of a specific embodiment thereof taken with reference to the accompanying drawings forming a part thereof, wherein:

DETAILED DESCRIPTION OF THE INVENTION

Figure 1:
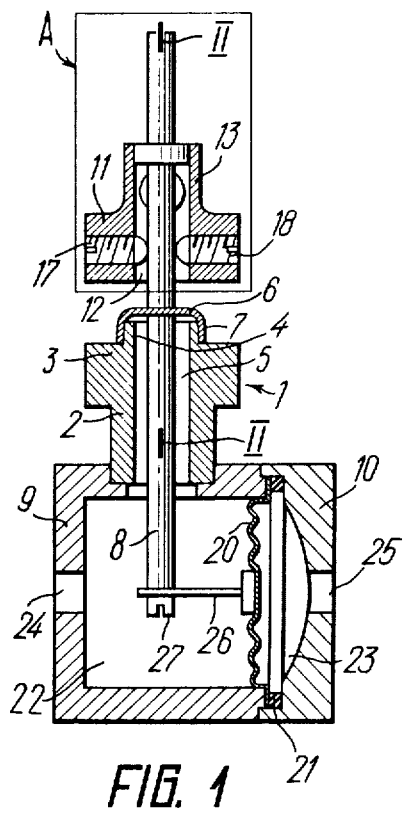
FIG. 1 is a sectional diagrammatic view of a device for transmitting the displacement of a pressure-responsive element as in combination with a differential-pressure transducer, according to the invention.

Reference being now directed to the accompanying drawings, FIG. 1 shows the device for transmitting the displacement of a pressure-responsive element situated in pressure space (viz., a differential pressure-responsive element in the given particular case) to comprise a base 1 defined by a cylindrical sleeve 2 with a flange 3 on whose face a cylindrical projection 4 is provided. A hole or bore 5 in the base is tightly sealed by a diaphragm 6 having a cylindrical beading or annular flange 7 the external perimeter thereof retain the diaphragm 6 on the cylindrical projection 4 by welding, for example.

The device comprises also a force-bar 8 passing through the hole 5 in the base 1 and through the diaphragm 6 at its center, with the force-bar 8 and the diaphragm 6 being tightly sealed thereto by welding. The end of the force-bar 8 located on the non-pressure side of the diaphragm 6 (i.e., outside the pressure space confined within a casing 9 and a cover 10) carries a cross-bar which in the given particular embodiment of the device is made as a flange 11 with a central hole 12 through which the force-bar 8 passes at a certain clearance defined by virtue of the difference in the diameters of the hole 12 and the force-bar 8. The cross-bar is connected to the force-bar 8 by way of a resilient member, and in the embodiment under consideration is defined by a thin-walled cylinder 13 integral with the flange 11 and enclosing the force-bar 8. The thin-walled cylinder 13 has one end welded to the force-bar 8, while the flange 11 is free to move with respect to the latter within the defined clearance.

Whenever the thin-walled cylinder is defined by an independent element, its other end is held to the flange by welding.

In addition, the device has two struts 14 (FIG. 2) constituted by round-section rods and located on the diametrally opposite sides of the diaphragm 6. With their ends, the struts 14 are held fast in holes 15 of the base 1 and in holes 16 of the flange 11 by welding. The longitudinal axes of the struts 14 lie approximately in the same plane with the axis of the diaphragm 6. Means is provided for varying the position of the axes of the struts, viz., adjustable stops defined by screws 17 and 18 (FIG. 1) and arranged in the flange 11 on the opposite sides so as to interact with the force-bar 8.

The adjustable stops may alternatively be implemented as wedge blocks. However, the provision of the stops as screws is structurally simpler. To reduce the bending stiffness of the thin-walled cylinder 13 when the flange 11 moves with respect to the force-bar 8, provision is made in the cylinder for diametrally opposed holes 19 (FIG. 2) whose axis lies in the same plane with the struts 14.

The base 1 is hermetically secured (by welding) to the casing 9 (FIG. 1) which accommodates a differential pressure-responsive diaphragm 20 (i.e., pressure-responsive element). The longitudinal axes of the struts 14 (FIG. 2) are arranged in a plane perpendicular to the direction of displacement of the diaphragm 20 (FIG. 1) under the effect of differential pressure. The diaphragm 20 is held along its external perimeter to the casing 9 by welding and hermetically sealed to the cover 10 by a seal ring 21. Pressure-tight chambers 22 and 23 established by the diaphragm 30 serve for admitting the pressures under measurement thereto through holes 24 and 25. The diaphragm 20 interacts with the end of the force-bar 8 by way of a resilient member 26 defined, in the given particular case by an elastic band with its one end welded at the center of the diaphragm 20 and with the other end locked-in with the end of the force-bar 8 by means of a screw 27.

Figure 2:
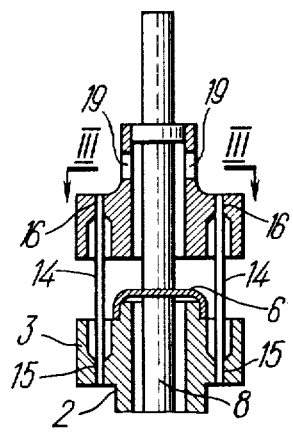
FIG. 2 is a fragmentary section taken on the line II—II through a portion of the device of FIG. 1.
Figure 3:
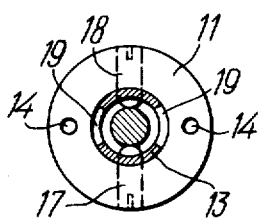
FIG. 3 is a section taken on the line III—III in FIG. 2.

It can be seen in FIG. 3 representing a section on the line III—III in FIG. 2, that the axes of the struts 14, the axes of the holes 19 and the axes of the diaphragm 6 are arranged approximately in the same plane, while the axes of the stops, viz., a screws 17 and 18 lie in the plane perpendicular to the aforesaid plane.

Figure 4:
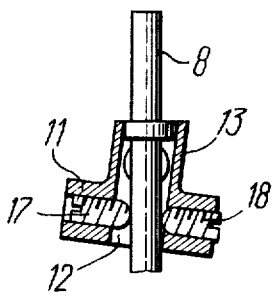
FIG. 4 is a portion A of FIG. 1 showing the stops in one of the extreme adjusted positions thereof.

FIG. 4 illustrates the portion A of FIG. 1 showing the stops, viz., the screws 17 and 18 in one of their extreme adjusted positions.

Figure 5:
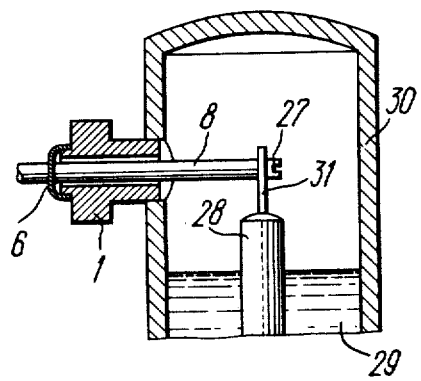
FIG. 5 is a fragmentary sectional view of a device for transmitting the displacement of a pressure-responsive element as in combination with a level gauge, according to the invention.

FIG. 5 fragmentarily shows the present device for transmitting the displacement of a pressure-responsive element situated in a pressure space as in combination with another embodiment of the pressure-responsive element, viz., a level-gauge float 28. The level float 28 indicates the level of a fluid 29 contained in a hermetically sealed shell 30, in which a pressure other-than-atmospheric is maintained. In this case, the base 1 of the device for transmitting the displacement of a pressure-responsive element is hermetically held to the shell 30 over the free surface of the liquid 29 in such a way that the axis of the force-bar 8 is approximately parallel to such surface. The end of the force-bar 8 protruding into the shell 30 is connected to a resilient member 31, a wire cable in the given particular case, through the screw 27, while the other end of the resilient member 31 is held to the level float 28.

The device for transmitting the displacement of a pressure-responsive element situated in pressure space operates as follows;

Displacement of a pressure-responsive element, viz., the diaphragm 20 (FIG. 1) caused by the effect of differential pressure admitted to pass into the chambers 22 and 23 through the holes 24 and 25, is transmitted via the resilient member 26 to the end of the force-bar 8 which is situated in a static-pressure space; "under static Pressure" means the pressure effective inside the chamber 22 and exerting upon the device (i.e., the diaphragm 6) for transmitting the displacement of a pressure-responsive element; as a result, the force-bar 8 pivots about an axis defined as the intersection of the plane of arrangement of the diaphragm 6 with the plane of arrangement of the two longitudinal axes of the struts 14 (pivot axis of the force-bar 8), and the output end of the force-bar 8 located on the other side of the diaphragm 6 outside the static-pressure space, moves in proportion with the displacement of the diaphragm 20.

The resultant force developed by the pressure applied to the diaphragm 6, is taken by the struts 14 which keep the force-bar 8 against movement lengthwise the axis thereof. However, when the pressure force is not passed through the pivot axis of the force-bar 8, a moment of reaction force is created on the force-bar 8 and causes the latter to rotate through an angle about its pivot axis, resulting in an error in the measurement of the displacement of the diaphragm 20. To compensate for said error, the screws 17 and 18 interacting with the force-bar 8 are shifted, with the result that the flange 11 is turned with respect to the force-bar 8 by virtue of a bending of the thin-walled cylinder 13 as shown in FIG. 4. As a result, the longitudinal axes of the struts 14 (FIG. 2) change their position and, consequently, the position of the pivot axis of the force-bar 8 is changed accordingly when the displacement of a pressure-responsive element situated in pressure space is transmitted.

Calibration of the device for transmitting the displacement of a pressure-responsive element is carried out by shifting the screws 17 and 18 when equal pressures pass into the chambers 22 and 23 to attain such a position of the longitudinal axes of the struts 14, in which the pivot axis of the force-bar 8 will coincide with the point of application of the resultant force of pressure exerted upon the diaphragm 6, i.e., the output end of the force-bar 8 will not move. In this case, the device for transmitting the displacement of a pressure-responsive element will be invariant with respect to static pressure and, consequently, will provide a high-accuracy transmission of the displacement of a pressure-responsive element.

Discussed above is the operation of the device in conjunction with a differential-pressure transducer.

The operation of the device for transmitting the displacement of a pressure-responsive element in combination with a liquid level gauge occurs in a similar way.

In response to a change in the level of the liquid 29, (FIG. 5) the buoyant force exerted upon the level float 28 varies accoringly and acts through the resilient member 31 upon the force-bar 8, thus causing its output end to move.

What is claimed is:

1. A device for transmitting the displacement of a pressure-respensive element situated in pressure space confined within a shell, comprising: a base hermetrically held to said shell; said base having a hole; a diaphragm hermetrically held along the external perimeter of said hole; a force-bar having opposite ends, said force-bar passing at the center of said diaphragm and hermetically held therein; one end of said force-bar being adapted to interact with said pressure-responsive element; the other end of said force-bar serving essentially as the output of the device; a cross-bar provided at said output end of the force-bar; a resilient member, whereby said cross-bar is held to said force-bar; two struts having axes which lie approximately in the same plane with the axis of said diaphragm; said struts having opposite ends, said struts being secured with one of their ends to said base; the other end of said struts being secured to said cross-bar; and a means for varying the position of the axes of said struts relative to the force bar; said means being defined by adjustable stops provided in said cross-bar and adapted to interact with said force-bar.

2. The device as claimed in claim 1, wherein said resilient member is defined by a thin-walled cylinder having opposite ends, said cylinder enclosing said force-bar and with its one end connected to the latter, while the other end thereof is locked-in with said cross-bar.

3. The device as claimed in claim 2, wherein said thin-walled cylinder has diametrally opposite holes whose axis lies in the plane of arrangement of said struts.

4. The device as claimed in claim 1, wherein said stops are defined by screws arranged in said cross-bar square to the axis of said force-bar on both sides thereof.

5. The device as claimed in claim 1, wherein said cross-bar is defined by a flange provided with a central hole whose diameter is somewhat larger than the diameter of said force-bar.

6. The device as claimed in claim 5, wherein said struts are defined by round-section rods.

7. The device as claimed in claim 5, wherein said resilient member is essentially a thin-walled cylinder having a vacant end, said cylinder being integral with said flange and with its vacant end secured to said force-bar.

* * * * *